United States Patent
Lee et al.

(10) Patent No.: US 8,958,497 B2
(45) Date of Patent: Feb. 17, 2015

(54) SIMULTANEOUS TRANSMISSION OF CLOCK AND BIDIRECTIONAL DATA OVER A COMMUNICATION CHANNEL

(71) Applicant: Silicon Image, Inc., Sunnyvale, CA (US)

(72) Inventors: Inyeol Lee, Saratoga, CA (US); Baegin Sung, Sunnyvale, CA (US); Hanwoong Sohn, San Jose, CA (US); Shinje Tahk, Sunnyvale, CA (US); Sun Woo Baek, Cupertino, CA (US); Chandlee B. Harrell, Los Altos, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 0 days.

(21) Appl. No.: 13/834,927

(22) Filed: Mar. 15, 2013

(65) Prior Publication Data
US 2013/0329828 A1    Dec. 12, 2013

Related U.S. Application Data

(60) Provisional application No. 61/658,875, filed on Jun. 12, 2012.

(51) Int. Cl.
*H04B 15/00* (2006.01)
*H04B 7/015* (2006.01)
*H04L 25/49* (2006.01)
*H04B 3/23* (2006.01)

(52) U.S. Cl.
CPC ............ *H04B 7/015* (2013.01); *H04L 25/4904* (2013.01); *H04B 3/23* (2013.01)
USPC ........................................................ 375/285

(58) Field of Classification Search
CPC ................................... H04B 3/23; H04B 7/015
USPC .......................................................... 375/285
See application file for complete search history.

(56) References Cited

U.S. PATENT DOCUMENTS

| | | | | |
|---|---|---|---|---|
| 4,074,086 A | * | 2/1978 | Falconer et al. | 379/406.08 |
| 4,131,767 A | * | 12/1978 | Weinstein | 379/406.06 |
| 6,463,092 B1 | | 10/2002 | Kim et al. | |
| 6,738,417 B1 | * | 5/2004 | Kim et al. | 375/220 |
| 7,065,133 B1 | * | 6/2006 | Phanse et al. | 375/219 |

(Continued)

OTHER PUBLICATIONS

"High-Definition Multimedia Interface Specification Version 1.3," HDMI Licensing, LLC, Jun. 22, 2006, 237 pages.

(Continued)

*Primary Examiner* — Juan A Torres
(74) *Attorney, Agent, or Firm* — Fenwick & West LLP (57) ABSTRACT

Embodiments of the invention are generally directed to simultaneous transmission of clock and bidirectional data over a communication channel. An embodiment of a transmitting device includes a modulator to generate a modulated signal including a clock signal and a data signal, the clock signal being modulated by a first signal edge of the modulated signal and the data signal being modulated by a position of a second signal edge of the modulated signal; a driver to drive the modulated signal on a communication channel; an echo canceller to subtract reflected signals on the communication channel; and a data recovery module to recover a signal received on the communication channel, the received signal being encoded by Return-to-Zero (RZ) encoding, the signal being received simultaneously with driving the modulated signal on the communication channel.

7 Claims, 6 Drawing Sheets

(56) References Cited

U.S. PATENT DOCUMENTS

| | | | |
|---|---|---|---|
| 7,535,957 B2* | 5/2009 | Ozawa et al. | 375/238 |
| 8,442,099 B1* | 5/2013 | Sederat | 375/219 |
| 2003/0231763 A1* | 12/2003 | Lilliott et al. | 379/406.01 |
| 2004/0141568 A1* | 7/2004 | Huat | 375/295 |
| 2004/0247022 A1* | 12/2004 | Raghavan et al. | 375/219 |
| 2007/0098112 A1* | 5/2007 | Kim et al. | 375/312 |
| 2010/0104029 A1 | 4/2010 | Lee et al. | |

OTHER PUBLICATIONS

PCT International Search Report and Written Opinion, PCT Application No. PCT/US2013/040211, Aug. 27, 2013, 13 pages.

\* cited by examiner

SIMULTANEOUS TRANSMISSION OF CLOCK AND BIDIRECTIONAL DATA OVER A COMMUNICATION CHANNEL

CROSS-REFERENCE TO RELATED APPLICATION

This application claims the benefit of priority from U.S. Provisional Patent Application No. 61/658,875 filed Jun. 12, 2012, which is incorporated herein by reference in its entirety.

TECHNICAL FIELD

Embodiments of the invention generally relate to the field of data communications and, more particularly, to simultaneous transmission of clock and bidirectional data over a communication channel.

BACKGROUND

Transmission over a serial link using clock forwarding is used in multimedia streaming applications such as HDMI™ (High Definition Multimedia Interface, including High Definition Multimedia Interface 1.4 Specification, issued May 28, 2009) and MHL™ (Mobile High-Definition Link) for the overall system simplicity and improved noise performance of such transmission. MHL is an interface protocol that provides for connection of a mobile device to an HDMI display device. Such protocols allow for the transfer of high definition multimedia data between certain devices.

One of the drawbacks of a clock forwarding scheme is the use of a clock channel. In terms of bandwidth utilization, a dedicated clock channel requires additional overhead compared to a CDR (Clock and Data Recovery) based serial link because the clock channel doesn't convey any data. In addition, in some cases, there are physical limitations on number of connector pins or cable wires in an apparatus, which complicates or prevents the use of a dedicated clock channel.

U.S. Pat. No. 6,463,092 of Kim, et al., regards sending and receiving data signals over a clock signal line, including a transmitter that sends both clock and data signals over the same transmission line and a receiver that uses the same transmission line to transmit data signals back to the transmitter.

United States Patent Application Publication No. 2010/0104029 of Lee, et al., regards independent links over differential pairs using common-mode signaling, including pairs of differential pairs being utilized to create a virtual differential pair for data transfer.

BRIEF DESCRIPTION OF THE DRAWINGS

Embodiments of the invention are illustrated by way of example, and not by way of limitation, in the figures of the accompanying drawings in which like reference numerals refer to similar elements.

SUMMARY

Embodiments of the invention are generally directed to simultaneous transmission of clock and bidirectional data over a communication channel.

In a first aspect of the invention, an embodiment of a transmitting device includes a modulator to generate a modulated signal including a clock signal and a data signal, the clock signal being modulated by a first edge of the modulated signal and the data signal being modulated by a position of a second edge of the modulated signal; a driver to drive the modulated signal on a communication channel; an echo canceller to subtract reflected signals on the communication channel; and a data recovery module to recover a signal received on the communication channel, the received signal being encoded by a Return-to-Zero (RZ) encoding, the signal being received simultaneously with driving the modulated signal on the communication channel.

In a second aspect of the invention, an embodiment of a receiving device includes an edge detector to detect a first edge of a signal received on a communication channel, the edge detector to extract a clock signal from the received signal; a data recovery module to recover a data signal from the received signal, the data signal being modulated by a position of a second edge of the received signal; a encoder to encode a signal for transmission, the encoder to encode the signal using Return-to-Zero (RZ) encoding; a driver to drive the encoded signal the communication channel, the encoded signal being driving simultaneously with receipt of the received signal; and an echo canceller to subtract reflected signals on the communication channel.

DETAILED DESCRIPTION

Embodiments of the invention are generally directed to simultaneous transmission of clock and bidirectional data over a communication channel.

In some embodiments, an apparatus, system, and method provides for transmitting clock and forward data from Tx (transmitter) to Rx (receiver) and backward data from Rx to Tx at the same time over a communication channel. In some embodiments, a transmitter sending forward clock and data uses a signal edge modulation, which may be modulation of a falling edge of a signal, and a receiver sending backward data uses RZ encoding for the backward data.

In some embodiments, a doubly-terminated channel with echo cancellers provided at the transmitter and receiver sides recovers incoming data. In some embodiments, a method provides for sending clock signals and forward data from a transmitter to a receiver, and backward data from the receiver to the transmitter at the same time over a communication channel. In some embodiments, an apparatus or system allows for combining a dedicated clock channel and a data channel, or, phrased in a different manner, allows for sending clocks over a bidirectional data channel, thus removing a major drawback of a forwarded clock serial link.

A communication channel for transmission of a clock signal and bidirectional data may vary in different embodiments. In some embodiments, a clock signal and bidirectional data may be transmitted via a channel having a single conductor, such as single-ended wire. In some embodiments, a clock signal and bidirectional data (which may be referred to here as triplex communication) may be transmitted using differential signaling over a channel having a differential pair of wires, where differential signaling provides for transmitting complementary signals via the differential pair. A communication channel may be included in a cable with any number of other channels and conductors.

In some embodiments, if an implementation utilizes a differential pair for transmission of audio-video data, such as in MHL, the apparatus addresses the requirements of the MHL standard, or the requirements of similar audio-video standards or implementations. In such implementation, the clock is related to the video rate of the data transferring on the TMDS (transition minimized differential signaling) data pair. However, the CBUS data rate is also related to the clock. If the clock is tied to video rate, then, for example, an HD (high definition) video may run the CBUS data channel at 150 Mbps, but when switching to transmitting an SD (Standard Definition) video then the CBUS data channel will be limited to 27 Mbps. In some embodiments, an apparatus, system, or method provides for multiplying or dividing the video clock to maintain a relatively stable clock rate on the CBUS. In an example, if a 600 Mbps target is set for CBUS data channel, then the 27 MHz SD clock may be multiplied by 22 or 23 (in and integer case) to generate the clock sent over CBUS. Further, the 150 MHz HD clock is multiplied by 4 to get to 600 Mbps. In some embodiments, a relationship between a video clock and a clock signal on the CBUS may be an integer, rational, or arbitrary factor, with differing levels of implementation complexity.

In some embodiments, in contrast to a conventional apparatus or system, a receiving apparatus includes clock extraction at the receiver. An echo cancelling method in a full-duplex link may operate to subtract a self-generated voltage signal, where the signal is the driver current I times load impedance, the load resistance being the termination resistance in parallel with the cable impedance ($R_{term}$||Z0). Assuming $R_{term}$=Z0, the echo canceller then may subtract $0.5*I*R_{term}$ from the receiver input voltage to extract the incoming signal. However, in an actual application the cable impedance Z0 is not well controlled and includes a deviation from the ideal value, thus causing voltage error in the echo cancelling process. For a conventional full-duplex receiver this error may be small enough not to cause a bit error, unless the impedance mismatch is significant thus causing a large voltage error. However, for clock extraction, any error due to mismatch causes jitter in the extracted clock, thus degrading link performance.

In some embodiments, to prevent jitter in clock extraction, an apparatus, system, or method uses RZ (Return-to-Zero) encoding for backward data from the receiver to the transmitter. RZ encoding returns to a default level regardless of whether a '1' or '0' is sent. In some embodiments, the default period is aligned with the clock rising edge arrival at receiver, and thus there is no mismatch-induced jitter added to extracted clock. In some embodiments, an apparatus, system, or method utilizes phase adjustment of the RZ encoded data to preserve a signal edge (such as a rising signal edge) for the transmitted clock signal.

Figure 1:
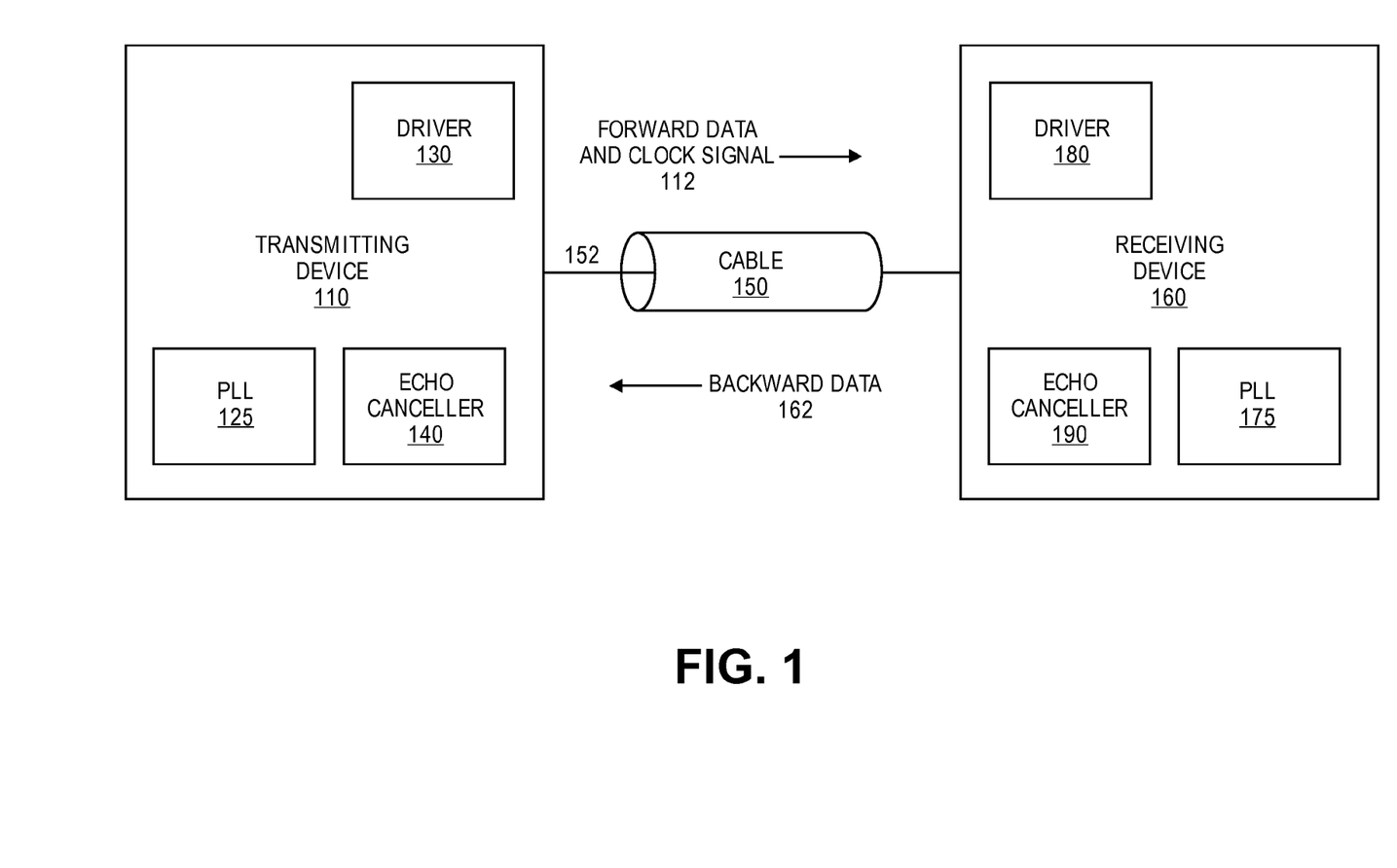
FIG. 1 is an illustration of an embodiment of a transmitter and receiver for transmission of clock signals and bidirectional data simultaneously over a communication channel.

FIG. 1 is an illustration of an embodiment of a transmitter and receiver for transmission of clock signals and bidirectional data simultaneously over a communication channel. In this illustration, a first device, illustrated as the transmitting device 110, is coupled with a first end of a cable 150, where the cable 150 includes at minimum a communication channel 152. In some embodiments, the communication channel 152 is a differential two-wire (conductor) channel, and in some embodiment the channel 152 is a single wire (conductor) channel. The cable may include any number of other communication channels or connections. A second device, designated as the receiving device 160, is coupled with a second end of the cable 150.

In some embodiments, the transmitting device 110 and receiving device 160 both include a driver (130 and 180 respectively) and an echo canceller (140 and 190 respectively) for the transmission of data and for the elimination of reflected signals. In some embodiments, the transmitting device 110 is to provide for transmission of forward data and clock signals 112 to the receiving device 160 over the communication channel 152 of the cable 150, where the receiving device 160 recovers the forward data and clock signals 112. In some embodiments, simultaneously with the transmission of the forward data and clock signals the receiving device 160 is to provide for transmission of backward data 162 to the transmitting device 110 over the same communication channel 152 of the cable 150. In some embodiments, the transmission of the forward data utilizes signal edge modulation, and the transmission of the reverse data uses Return-to-Zero encoding. In some embodiments, the transmitting device 110 and receiving device 160 may include a phase locked loop (PLL) circuit or module, PLL 125 and 175 respectively, to maintain a timing relationship between the transmitting device and the receiving device.

As used in this application, "forward data" refers to data being transmitted from a first device to a second device and "reverse data" refers to data being transmitted from the second device to the first data, where forward data and reverse data may be any kind of data. In some embodiments, the transmitter and receiver source impedance ($R_{term}$) is set to match the cable impedance to prevent high-speed signal reflection.

In some embodiments, the communication channel 152 is a differential pair, and the transmitting device 110 and receiving device 160 include elements required for differential signaling and handle transmission of the clock signal and directional data as needed for the differential channel, which may include, for example, the transmitting device 110 and receiving device 160 being operable to handle tri-level signaling.

When the communication channel 152 is a differential pair, different encoding schemes are possible in varying implementations. In each such implementation, there is an intent to avoid adding jitter that results due to imperfections of the Rx echo canceller. In some embodiments, a means for avoiding jitter includes the reverse data from Rx to Tx being at the default state when forward clock edge is arriving at Rx. In differential signaling, the following default states are possible:

(1) In some embodiments, a logic '0' state is a default state, where the positive (+) wire voltage is lower than the negative (−) wire voltage. With this approach, the differential voltage is LOW regardless of the data sent from Rx to Tx, and only switches to HIGH when sending a logical '1'. In some embodiments, this provides a straightforward expansion of single wire RZ signaling.

(2) An issue with approach (1) is DC imbalance because the voltage is mainly in the LOW state. In some embodiments, such as in cases in which DC-balance is required in a circuit, an apparatus or system may use a non-driven state where the (+) wire and the (−) wire have the same voltage. In this case, differential driver at Rx sends differential HIGH or LOW signals only during an RZ pulse period.

Figure 2:
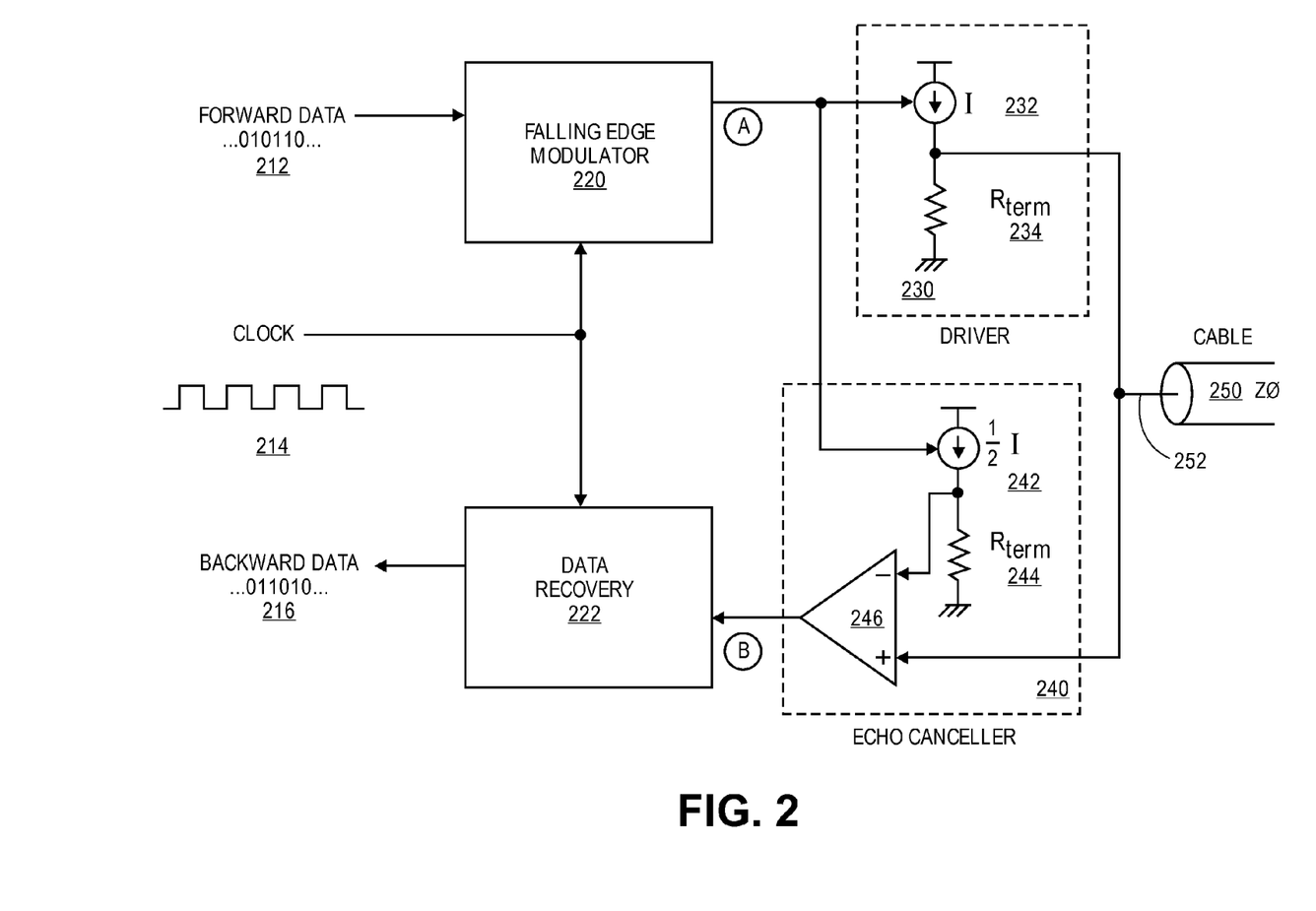
FIG. 2 illustrates an embodiment of a transmitting device for a clock signal and bidirectional data link.
Figure 3:
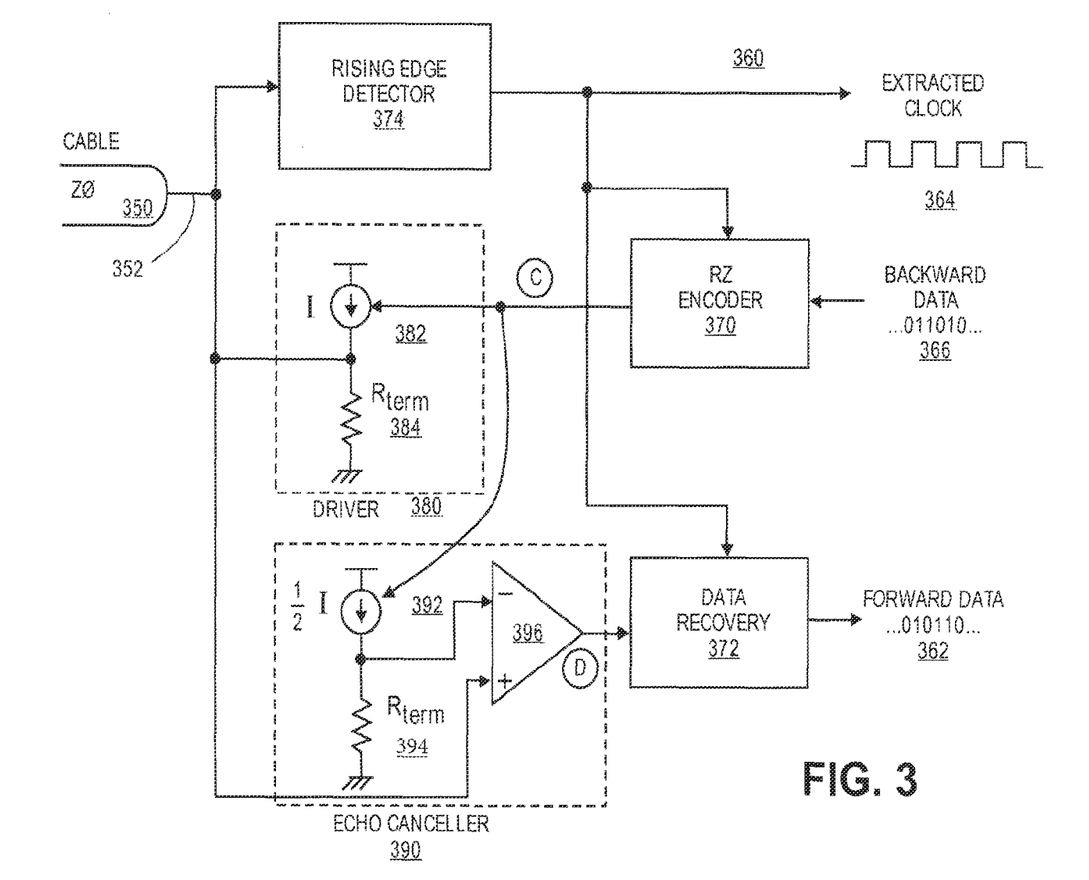
FIG. 3 illustrates an embodiment of a receiver for a clock signal and bidirectional data link.

FIG. 2 illustrates an embodiment of a transmitting device for a clock signal and bidirectional data link. FIG. 2 illustrates a transmitter portion of a communication link. The transmitting device illustrated in FIG. 2 and the receiving device illustrated in FIG. 3 are both full-duplex transceivers. A full duplex transceiver sends and receives data over a single channel simultaneously, where the receiver part of the full duplex transmitter normally subtracts or filters self-driven signal (echo) from the combined signal to assist in extracting data sent from the other transceiver in the link.

In this illustration, a transmitting device may be coupled with a cable 250, the cable having impedance Z0. In some embodiments, the transmitting device includes an edge modulator 220 that receives forward data 212 and clock signals 214. The modulated signal output at node A is received by a driver 230 as well as an echo canceller 240, the driver 230 including a driver current I, illustrated as current source 232 receiving the modulated data and clock signals coupled with a termination 234 with resistance $R_{term}$. In some embodiments, the resistance $R_{term}$ is set to match the cable impedance Z0 to prevent high-speed signal reflection. The forward data and clock signals are driven on a communication 252 channel of the cable 250.

In some embodiments, the transmitting device provides for receiving backward data simultaneously with the transmission of the forward data and clock signals. In some embodiments, signals are received on the communication channel 252 by the echo canceller 240 at a first input of an amplifier 246. The echo canceller includes a current source 242 of current value I/2 receiving the modulated forward data and clock signals to provide a current signal across a termination 244 with resistance $R_{term}$ and generate an echo cancellation signal, the echo cancellation signal being received at a second output of the amplifier 246.

In some embodiments, the output of the amplifier 246 (at node B in FIG. 2) is received at a data recovery circuit or module 222 (referred to generally as data recovery), the data recovery also receiving the clock signal 214. In some embodiments, the data recovery 222 operates to recover the backward data 216.

In some embodiments, in contrast with a conventional full-duplex transceiver, the transmitting device transmits the clock signals 214 together with the forward data 212. In some embodiments, the clock and forward data are combined using signal edge modulation, where the signal edge modulation maintains a first edge (such as a rising edge) of a clock unaltered but changes the location of the second edge (such as a falling edge) depending on the data sent. In some embodiments, this edge modulated signal drives the transmitter driver, and the echo canceller utilizes the signal edge modulated signal in extracting backward data sent from Rx.

FIG. 3 illustrates an embodiment of a receiver for a clock signal and bidirectional data link. FIG. 3 illustrates a receiver portion of a communication link. In this illustration, a receiving device 360 may be coupled with a cable 350, the cable including a communication channel 352 and having an impedance of Z0. In some embodiments, the communication channel 352 may be a differential pair or a single wire channel.

In some embodiments, the receiving device 360 includes RZ encoder 370 that is provided backward data 366 for encoding. The encoded data output of the RZ encoder 370 at node C is received by a driver 380 as well as an echo canceller 390, the driver 380 including a current source 382 with current I receiving the RZ encoded backward data coupled with a termination 384 with resistance $R_{term}$. In some embodiments, the resistance $R_{term}$ is set to match the cable impedance Z0 to prevent high-speed signal reflection. The backward data is driven on the communication channel 352 of the cable 350.

In some embodiments, the receiving device 360 provides for receiving the forward data and clock signals data simultaneously with the transmission of the backward data. In some embodiments, signals on the communication channel 352 are received at a rising edge detector 374 to extract the clock signal 364. In some embodiments, the signals on the communication channel 352 are also received at the echo canceller 390 at a first input of an amplifier 396. The echo canceller further includes a current source 392 of current value I/2 receiving the encoded reverse data from the RZ encoder 370 to provide a current signal across a termination 394 with resistance $R_{term}$ and generate an echo cancellation signal, the echo cancellation signal being received at a second output of the amplifier 396.

In some embodiments, the output of the amplifier 396 (at node D in FIG. 3) is received at a data recovery circuit or module 372 (referred to generally as data recovery), the data recovery also receiving the extracted clock 364. In some embodiments, the data recovery operates to recover the forward data 362, the recovered forward data 362 being clocked by the extracted clock 364.

In some embodiments, the extracted clock 364 may be utilized for one or more purposes in addition to clocking the recovered forward data, including application of the clock signal as a synchronous reference for one or more other channels, including, for example, as a reference for TMDS (transition minimized differential signaling) data on another communication channel. In some embodiments, the clock signal may have a relationship with a data rate on another channel, such as a video rate on a TMDS channel. In some embodiments, a variable multiple of the clock signal may be used to maintain a same or similar data bandwidth of the first channel irrespective of changes of transmitted data rate of another channel.

In some embodiments, in contrast to a conventional apparatus or system, a receiving apparatus includes clock extraction at Rx. An echo cancelling method in a full-duplex link may operate to subtract a self-generated voltage signal, where the signal is the driver current I times load impedance, the load resistance being the termination resistance in parallel with the cable impedance ($R_{term}$||Z0). Assuming $R_{term}$=Z0, the echo canceller then may subtract $0.5*I*R_{term}$ from the receiver input voltage to extract the incoming signal. However, in actual application the cable impedance Z0 is not well controlled and has a deviation from the ideal value, thus causing voltage error in the echo cancelling process. For a conventional full-duplex receiver this error may be small enough not to cause a bit error unless the impedance mismatch is significant, thus causing a large voltage error. However, for clock extraction, an error due to mismatch causes jitter in the extracted clock, thus degrading link performance.

In some embodiments, to prevent jitter in clock extraction, an apparatus, system, or method uses RZ (Return-to-Zero) encoding for backward data from the receiver to the transmitter. RZ encoding returns to a default level regardless of whether a '1' or '0' is sent. In some embodiments, the default period is aligned with the clock rising edge arrival at receiver, and thus there is no mismatch-induced jitter added to extracted clock. In some embodiments, the data transmission of the receiving device may include timing that is adjusted by a tuning algorithm, where the tuning algorithm operates to provide transmission at a phase that avoids a time that matches a rising edge of the transmitted signals in order to preserve a rising clock edge for the clock signal in the received data.

Figure 4A:
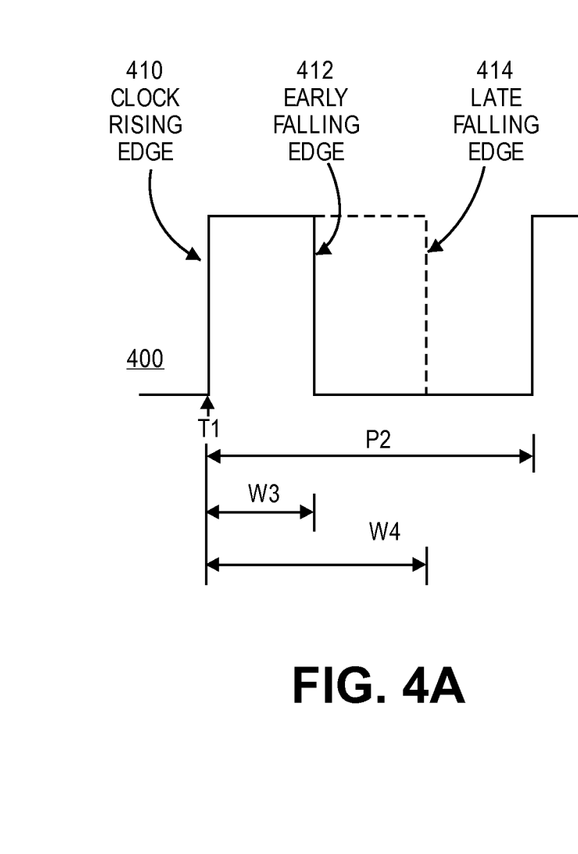
FIG. 4A is a waveform for signal edge modulated forward data in an embodiment of transmission of clock signals and bidirectional data.

FIG. 4A is a waveform for signal edge modulated forward data in an embodiment of transmission of clock signals and differential data. FIG. 4A represents the waveform 400 of forward data after signal edge modulation at node A of FIG. 2. In FIG. 4A, T1 is the time when the clock rising edge (or first edge) 410 arrives, P2 is the period of the clock, and W3 and W4 are widths respectively of a pulse having an early falling edge (second edge) 412 and a late falling edge 414. In some embodiments, a clock signal and forward data are combined such that a time of a clock rising edge 410 is not altered, with the time of the falling edge providing a data signal. In some embodiments, an early falling edge 412 may represent a data '0' being sent, and a late falling edge 414 may represent a data '1' being sent, or vice versa. While FIG. 4A illustrates two signal values, embodiments are not limited to the binary '1' and '0' values. In some embodiments, any number of values may be modulated by position of the falling edge.

In some embodiments, the data signal is sent to the receiver and appears at node D of FIG. 3 after echo cancellation. In some embodiments, data recovery at the receiving device is performed by checking the signal level of the data signal at time point T5+D6, which T5 is the time of extracted clock rising edge 450, and D6 is a delay set to a value W3<D6<W4, in order to sample the waveform between the locations of the early falling edge 404 and the late falling edge 406.

Figure 4B:
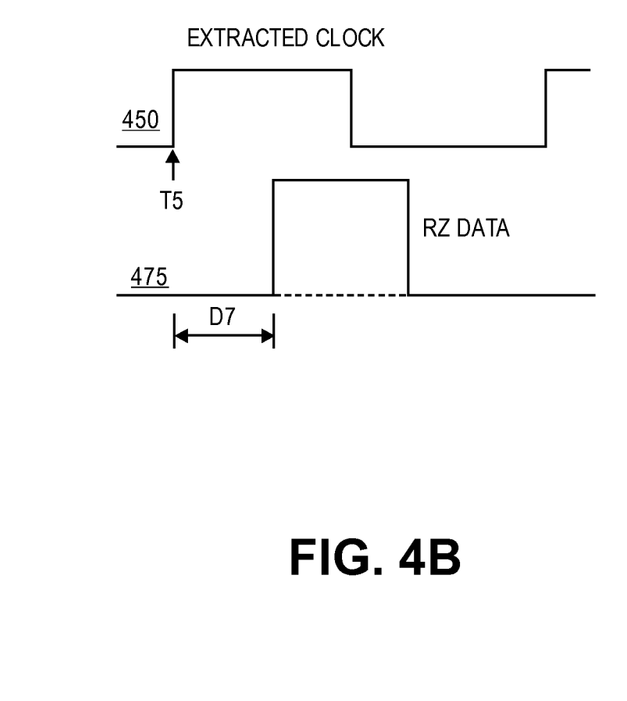
FIG. 4B is a waveform for RZ (Return-to-Zero) encoded backward data in an embodiment of transmission of clock signals and bidirectional data.

FIG. 4B is a waveform for RZ (Return-to-Zero) encoded backward data in an embodiment of transmission of clock signals and data. The extracted clock 450 and RZ data signal 475 are illustrated in FIG. 4B. FIG. 4B shows the waveform of RZ-encoded backward data at node B of FIG. 2. In some embodiments, RZ pulse timing is adjusted so that it stays in ZERO (default) state when the clock rising edge arrives at Rx. In some embodiments, this is accomplished by delaying the RZ pulse rising edge from the arriving clock rising edge location T5 by a delay D7. The RZ signal also appears at mode B of FIG. 2 after echo cancelling at the transmitting device.

In some embodiments, signals of a link between a transmitting device and a receiving device are generally synchronous with the rising edge of the clock in both the transmitting device and the receiving device, and thus there is no requirement for phase tracking. In some embodiments, an exception is the data recovery of backward data at the transmitting device. The RZ pulse that is extracted at the transmitting device is asynchronous to the transmitter clock, and thus phase tracking may be utilized to recover the backward data.

In some embodiments, an apparatus, system, or method provides for forward clock and full-duplex data with the same bit rate as the clock frequency while sharing a communication channel, where the communication channel may be, for example, a differential pair of wires or a single wire, thus improving the bandwidth utilization or reducing the number of wires necessary. In some embodiments, the serial link technology may be applied to MHL (Mobile High-definition Link). In certain implementations, MHL uses three wires for data, utilizing one differential pair and a single wire for clock and data transfer. In MHL operation, forward clock and multimedia data shares the differential pair, and a clock is sent as common mode voltage change of the differential signal. Further, slow speed control data is being sent through single wire. Issues with MHL may includes is that the common mode clock signal adds noise to differential data, and differential data adds noise to common move clock via mode conversion phenomenon (common mode voltage is converted to differential voltage, and vice versa). In some embodiments, simultaneous transmission of clock and bidirectional data over a communication channel is applied to MHL. In some embodiments, the Tx and Rx may run in MHL mode, or may switch to triplex signaling in which forward clock and control data is sent through the CBUS wire, and multimedia data is sent through a differential pair. In some embodiments, an apparatus or system may initially operate in a legacy MHL (MHL1 or MHL2) environment, the apparatus or system switching to triplex channel communication with simultaneous transmission of clock and bidirectional data after negotiation determines that both ends of a communication link support the triplex channel communication. In some embodiments, by detaching the clock and data, an apparatus or system operates to prevent noise injection from the clock and data.

The choice of communication channel for a particular implementation may be based on the environment. In some embodiments, including implementations in which there is a constrained pin-out arrangement, such as utilizing a micro-USB connector or other connector having a small physical size and limited number of connections, an alternative link configuration in an apparatus or system may include sending differential data via the differential pair, and sending a clock signal and full duplex data through the single ended wire. In some embodiments, the apparatus or system may be used to improve differential data signal integrity and to increase the CBUS data rate.

In contrast, in some embodiments, including embodiments in which pin-outs are less constrained or in noisy signal environments (such as, for example, an automotive environment), a link configuration for triplex communication of a clock signal and bidirectional data communication may include use of a differential pair for the transmission of the signal and bidirectional data. In some embodiments, an apparatus, system, or method includes application to data of one or more other standards, including, but not limited to, HDMI.

Figure 5:
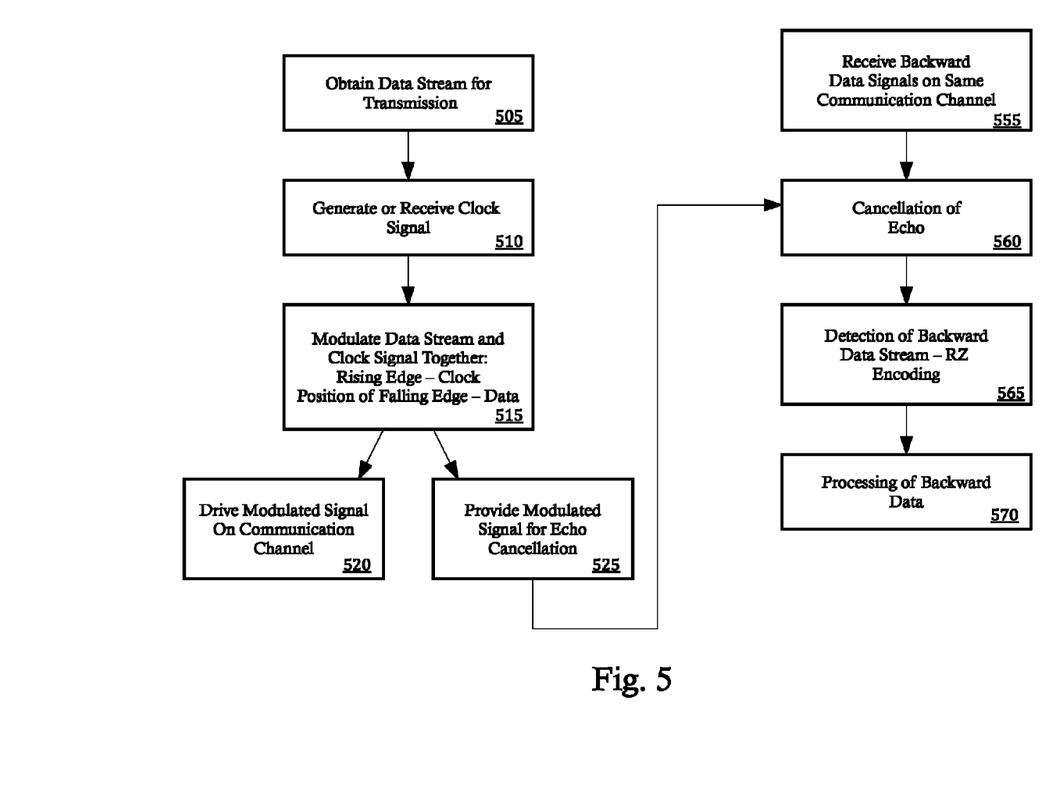
FIG. 5 is a flowchart to illustrate an embodiment of a method for transmission of clock signals and forward data simultaneously with receipt and processing of reverse data.

FIG. 5 is a flowchart to illustrate an embodiment of a method for transmission of clock signals and forward data simultaneously with receipt and processing of reverse data. In some embodiments, an apparatus (such as the transmitting device illustrated in FIG. 2) obtains a first set of data for transmission 505, the first set of data representing a forward data stream, and the transmitting device receives or generates a clock signal 510. In some embodiments, the apparatus modulates the forward data stream and clock signal together 515, where the modulation includes setting a first edge (such as a rising signal edge) as the clock signal and positioning a second edge (such as a falling signal edge) to encode a data value of the data stream. For example, an earlier falling edge may encode a '0' and a later falling edge may encode a '1', or vice versa. In some embodiments, a greater number of values may be encoded by additional positions of the falling edge. In some embodiments, the modulated signal may be driven on a communication channel 520 and may be utilized in echo cancelling 525.

In some embodiments, simultaneously with the processing and transmission of the clock signal and forward data stream, the apparatus receives backward data signals on the same communication channel 555. In some embodiments, the apparatus provides for echo cancellation for the communication channel using the modulated signals 560. The apparatus then detects a second set of data (which may be referred to as backward data) 565 and processes the second set of data as required for the apparatus 570.

Figure 6:
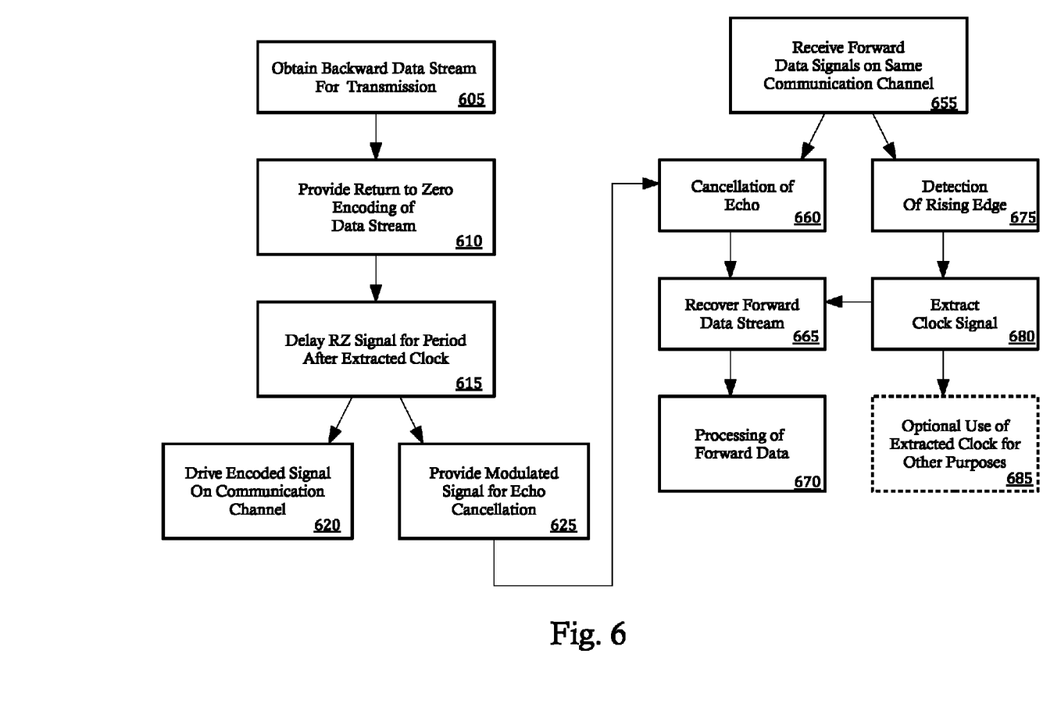
FIG. 6 is a flowchart to illustrate an embodiment of a method for trans mission of reverse data simultaneously with receipt and processing of clock signals and forward data.

FIG. 6 is a flowchart to illustrate an embodiment of a method for transmission of reverse data simultaneously with receipt and processing of clock signals and forward data. In some embodiments, an apparatus (such as the receiving device illustrated in FIG. 3) obtains a first set of data (representing a backward data stream) for transmission 605. In some embodiments, the apparatus encodes the backward data stream using Return-to-Zero (RZ) encoding 610. In some embodiments, the RZ encoded data may be delayed by a period after an extracted clock signal 615, described below. In some embodiments, the encoded data may be driven on a communication channel 620 and may be utilized in echo cancelling 625.

In some embodiments, simultaneously with the processing and transmission of the first set of data, the apparatus receives data signals on the same communication channel 655 containing a clock signal and a second set of data (a forward data stream). In some embodiments, the apparatus provides for echo cancellation for the communication channel using the modulated signals 660 and the detection of a first (rising) edge of the received signal 675. The apparatus then recovers the forward data stream 665, including use of a clock signal extracted from the received signal using the detected rising edge 680. In some embodiments, recovery of the data includes detection of a position of a second (falling) signal edge to detect a data bit, such as an earlier falling edge being detected as a '0' and a later falling edge being detected as a '1', or vice versa. In some embodiments, the apparatus provides for processing of the recovered forward data as required for the apparatus 670. In some embodiments, the apparatus may optionally utilize the extracted clock signal for other purposes 685.

In some embodiments, an apparatus, system, or method provides for:

(1) Triplex signaling sending clock and forward data from transmitter to receiver, and backward data from receiver to transmitter, via a single communication channel, where the communication channel may be, for example, a differential pair of wires or a single wire.

(2) Use of signal edge modulation scheme for Tx data in the triplex signaling, where a signal includes an early second edge for sending data '0' (a first value), and includes a late second edge for sending data '1' (a second value), or vice versa.

(3) Use of RZ signaling for Rx data, with the RZ data being aligned with incoming data with a specified delay in order to prevent jitter addition.

(4) Use of a phase locked loop (PLL) to control the timing relationship between Tx and Rx.

(5) Use of a line coding scheme, such as IBM 8b10b encoding, to provide easy byte alignment and reduce extracted clock jitter.

(6) Sending multi-bits per clock by fine-control of signal edge modulation (edge 0, 1, . . . N) instead of 2 values (early/late).

(7) Sending multi-bits per clock by fine-control of RZ pulse delay and width.

(8) Application in an MHL configuration.

In the description above, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form. There may be intermediate structure between illustrated components. The components described or illustrated herein may have additional inputs or outputs that are not illustrated or described. The illustrated elements or components may also be arranged in different arrangements or orders, including the reordering of any fields or the modification of field sizes.

The present invention may include various processes. The processes of the present invention may be performed by hardware components or may be embodied in computer-readable instructions, which may be used to cause a general purpose or special purpose processor or logic circuits programmed with the instructions to perform the processes. Alternatively, the processes may be performed by a combination of hardware and software.

Portions of the present invention may be provided as a computer program product, which may include a computer-readable storage medium having stored thereon computer program instructions, which may be used to program a computer (or other electronic devices) to perform a process according to the present invention. The computer-readable storage medium may include, but is not limited to, floppy diskettes, optical disks, CD-ROMs (compact disk read-only memory), and magneto-optical disks, ROMs (read-only memory), RAMs (random access memory), EPROMs (erasable programmable read-only memory), EEPROMs (electrically-erasable programmable read-only memory), magnet or optical cards, flash memory, or other type of media/computer-readable medium suitable for storing electronic instructions. Moreover, the present invention may also be downloaded as a computer program product, wherein the program may be transferred from a remote computer to a requesting computer.

Many of the methods are described in their most basic form, but processes may be added to or deleted from any of the methods and information may be added or subtracted from any of the described messages without departing from the basic scope of the present invention. It will be apparent to those skilled in the art that many further modifications and adaptations may be made. The particular embodiments are not provided to limit the invention but to illustrate it.

If it is said that an element "A" is coupled to or with element "B," element A may be directly coupled to element B or be indirectly coupled through, for example, element C. When the specification states that a component, feature, structure, process, or characteristic A "causes" a component, feature, structure, process, or characteristic B, it means that "A" is at least a partial cause of "B" but that there may also be at least one other component, feature, structure, process, or characteristic that assists in causing "B." If the specification indicates that a component, feature, structure, process, or characteristic "may", "might", or "could" be included, that particular component, feature, structure, process, or characteristic is not required to be included. If the specification refers to "a" or "an" element, this does not mean there is only one of the described elements.

An embodiment is an implementation or example of the invention. Reference in the specification to "an embodiment," "one embodiment," "some embodiments," or "other embodiments" means that a particular feature, structure, or characteristic described in connection with the embodiments is included in at least some embodiments, but not necessarily all embodiments. The various appearances of "an embodiment," "one embodiment," or "some embodiments" are not necessarily all referring to the same embodiments. It should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects.

In some embodiments, a transmitting device includes a modulator to generate a modulated signal including a clock signal and a data signal, the clock signal being modulated by a first signal edge of the modulated signal and the data signal being modulated by a position of a second signal edge of the modulated signal; a driver to drive the modulated signal on a communication channel; an echo canceller to subtract reflected signals on the communication channel; and a data recovery module to recover a signal received on the communication channel, the received signal being encoded by Return-to-Zero (RZ) encoding, the signal being received simultaneously with driving the modulated signal on the communication channel.

In some embodiments, the communication channel is a single wire channel.

In some embodiments, the communication channel is a differential pair channel.

In some embodiments, the modulation of the data signal includes a first value being encoded by a signal edge at a first position and a second value being encoded by a signal edge at a second position, wherein the second position is a later signal edge position than the first position.

In some embodiments, the transmitting device further includes a phase locked loop circuit to control a timing relationship with a receiving device.

In some embodiments, a receiving device includes an edge detector to detect a first edge of a signal received on a communication channel, the edge detector to extract a clock signal from the received signal; a data recovery module to recover a data signal from the received signal, the data signal being modulated by a position of a second edge of the received signal; a encoder to encode a signal for transmission, the encoder to encode the signal using Return-to-Zero (RZ) encoding; a driver to drive the encoded signal on the communication channel, the encoded signal being driving simultaneously with receipt of the received signal; and an echo canceller to subtract reflected signals on the communication channel.

In some embodiments, the communication channel is a single wire channel.

In some embodiments, the communication channel is a differential pair channel.

In some embodiments, the modulation of the received signal includes a first value being encoded by a signal edge at a first position and a second value being encoded by a signal edge at a second position, wherein the second position is a later signal edge position than the first position. In some embodiments, data transmission of the receiving device includes timing that is adjusted by a tuning algorithm, the tuning algorithm to operate to provide transmission at a phase that avoids a time that matches a rising edge of the transmitted signals in order to preserve a rising clock edge for the clock signal in the received data.

In some embodiments, the receiving device further comprising a phase locked loop circuit to control a timing relationship with a transmitting device.

In some embodiments, a method includes transmitting a clock signal and a first set of data on a communication channel, including: modulating the clock signal and the first set of data together, wherein the modulation includes setting a first signal edge as the clock signal and positioning a second signal edge to encode a data value of the data stream, and driving the modulated signal on a communication channel and providing the modulated signal for echo cancellation; and receiving a second set of data on the same communication channel, including: receiving signals on the communication channel, cancelling signal echo on the communication using the modulated signal, and detecting the second set of data in the received signals, where the second set of signals is encoded with Return-to-Zero encoding. In some embodiments, the transmission of the clock signal and the first set of data occurs simultaneously with the reception of the second set of data.

In some embodiments, the modulation of the first set of data includes a first value being encoded by a signal edge at a first position and a second value being encoded by a signal edge at a second position, wherein the second position is a later signal edge position than the first position.

In some embodiments, a method includes transmitting a first set of data on a communication channel, including: encoding the first set of data, wherein the first set of signals is encoded with Return-to-Zero encoding, and driving the encoded signal on a communication channel and providing the encoded signal for echo cancellation; and receiving a clock signal and a second set of data on the same communication channel, including: receiving signals on the communication channel, detecting a first edge of the received signals to extract the clock signal; cancelling signal echo on the communication using the encoded signal, and detecting the second set of data in the received signals using the extracted clock signal, wherein the modulation of the second set of data includes a position of the second signal edge to encode a data value of second set of data. In some embodiments, the reception of the clock signal and the second set of data occurs simultaneously with the transmission of the first set of data.

In some embodiments, the method further includes delaying transmission of an encoded signal of first set of data a certain period of time in relation to the extracted clock signal.

In some embodiments, the method further includes applying the extracted clock signal as a synchronous reference for a second communication channel.

In some embodiments, a variable multiple of the clock signal is used to maintain a same or similar data bandwidth of the communication channel irrespective of changes in a transmitted data rate of the second communication channel.

What is claimed is:

1. A transmitting device comprising:
    a modulator to generate a modulated signal including a clock signal and a data signal, the clock signal being modulated by a first signal edge of the modulated signal and the data signal being modulated by a position of a second signal edge of the modulated signal;
    a driver to drive the modulated signal on a communication channel;
    an echo canceller to subtract reflected signals on the communication channel; and
    a data recovery module to recover a signal received on the communication channel, the received signal being encoded by Return-to-Zero (RZ) encoding, the signal being received simultaneously with driving the modulated signal on the communication channel.

2. The transmitting device of claim 1, wherein the communication channel is a single wire channel.

3. The transmitting device of claim 1, wherein the communication channel is a differential pair channel.

4. The transmitting device of claim 1, wherein the modulation of the data signal includes a first value being encoded by a signal edge at a first position and a second value being encoded by a signal edge at a second position, wherein the second position is a later signal edge position than the first position.

5. The transmitting device of claim 1, further comprising a phase locked loop circuit to control a timing relationship with a receiving device.

6. A method comprising:
    transmitting a clock signal and a first set of data on a communication channel, including:

modulating the clock signal and the first set of data together, wherein the modulation includes setting a first signal edge as the clock signal and positioning a second signal edge to encode a data value of the data stream, and driving the modulated signal on a communication channel and providing the modulated signal for echo cancellation; and receiving a second set of data on the same communication channel, including;

receiving signals on the communication channel, cancelling signal echo on the communication using the modulated signal, and detecting the second set of data in the received signals, where the second set of signals is encoded with Return-to-Zero encoding;

wherein the transmission of the clock signal and the first set of data occurs simultaneously with the reception of the second set of data.

7. The method of claim 6, wherein the modulation of the first set of data includes a first value being encoded by a signal edge at a first position and a second value being encoded by a signal edge at a second position, wherein the second position is a later signal edge position than the first position.

* * * * *